United States Patent
Fox et al.

(10) Patent No.: US 12,118,662 B2
(45) Date of Patent: Oct. 15, 2024

(54) OPTIMIZING COMPUTER-BASED GENERATION OF THREE-DIMENSIONAL VIRTUAL OBJECTS

(71) Applicant: International Business Machines Corporation, Armonk, NY (US)

(72) Inventors: Jeremy R. Fox, Georgetown, TX (US); Martin G. Keen, Cary, NC (US); Alexander Reznicek, Troy, NY (US); Bahman Hekmatshoartabari, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 17/933,378

(22) Filed: Sep. 19, 2022

(65) Prior Publication Data

US 2024/0096012 A1 Mar. 21, 2024

(51) Int. Cl.
*G06T 17/00* (2006.01)
*G06T 5/77* (2024.01)
*G06T 19/20* (2011.01)

(52) U.S. Cl.
CPC ............... *G06T 17/00* (2013.01); *G06T 5/77* (2024.01); *G06T 19/20* (2013.01); *G06T 2219/2012* (2013.01)

(58) Field of Classification Search
CPC G06T 17/00; G06T 5/77; G06T 19/20; G06T 2219/2012
See application file for complete search history.

(56) References Cited

U.S. PATENT DOCUMENTS

| | | | |
|---|---|---|---|
| 8,113,959 B2 | 2/2012 | De Judicibus | |
| 8,230,045 B2 | 7/2012 | Kawachiya | |
| 8,386,918 B2 | 2/2013 | Do | |
| 10,627,985 B2 * | 4/2020 | Qian | G06F 3/016 |
| 2020/0033866 A1 | 1/2020 | Song | |
| 2021/0178267 A1 | 6/2021 | St-Pierre | |
| 2021/0275925 A1 | 9/2021 | Kolen | |
| 2023/0153606 A1 * | 5/2023 | Min | G06N 3/08 |
| | | | 706/25 |

FOREIGN PATENT DOCUMENTS

WO WO-2023239358 A1 * 12/2023 ......... G06F 3/04842

OTHER PUBLICATIONS

Anonymous, "Diffusionclip: Text-Guided Image Manipulation Using Diffusion Models", Under review as a conference paper at ICLR 2022, 11 pages, <https://openreview.net/pdf?id=TKMJ9eqtpgP>.

(Continued)

*Primary Examiner* — Antonio A Caschera
(74) *Attorney, Agent, or Firm* — Joseph P. Curcuru

(57) ABSTRACT

In an approach to improve the generation of a virtual object in a three-dimensional virtual environment, embodiments of the present invention identify a virtual object to be generated in a three-dimensional virtual environment based on a natural language utterance. Additionally, embodiments generate the virtual object based on a CLIP-guided Generative Latent Space (CLIP-GLS) analysis, and monitor usage of the generated virtual object in the three-dimensional virtual space. Moreover, embodiments infer human perception data from the monitoring, and generate a utility score for the virtual object based on the human perception data.

20 Claims, 3 Drawing Sheets

(56) References Cited

OTHER PUBLICATIONS

Chen, et al., "Intelligent Home 3D: Automatic 3D-House Design from Linguistic Descriptions Only", arXiv:2003.00397v1, Mar. 1, 2020, 14 pages, <https://arxiv.org/abs/2003.00397>.

Dutta, Aratrika, "Meta introduces BuilderBot, a new tool to fuel creativity in the metaverse using voice commands," Feb. 25, 2022 [Accessed Jun. 18, 2022], 2 pages, <https://www.analyticsinsight.net/builderbot-meta-introduces-a-new-creativity-tool-something-new-this-time/>.

Fujii, et al., "RGB-D Image Inpainting Using Generative Adversarial Network with a Late Fusion Approach", arXiv:2110.07413v1, Oct. 14, 2021, 12 pages.

Hong, et al. "AvatarCLIP: Zero-Shot Text-Driven Generation and Animation of 3D Avatars", arXiv:2205.08535v1, May 17, 2022, 19 pages.

Jain, et al., "Zero-Shot Text-Guided Object Generation with Dream Fields", arXiv:2112.01455v2, May 4, 2022, 14 pages.

Unknown, "Dall-E 2", Open AI, retrieved from internet Sep. 15, 2022, 10 pages, <https://openai.com/dall-e-2/>.

Zhang, et al., "InDepth: Real-time Depth Inpainting for Mobile Augmented Reality," Proc. ACM Interact. Mob. Wearable Ubiquitous Technol., vol. 6, No. 1, Article 37, Mar. 2022, 25 pages.

\* cited by examiner

OPTIMIZING COMPUTER-BASED GENERATION OF THREE-DIMENSIONAL VIRTUAL OBJECTS

BACKGROUND OF THE INVENTION

The present invention relates generally to computer generation of virtual objects in a three-dimensional space, and more particularly to the field of improving computer-based utility of a virtual object in a three-dimensional space.

The metaverse is a convergence of technologies that enable multisensory interactions with virtual environments, digital objects, and people such as virtual reality (VR) and augmented reality (AR). In addition to being a platform for work and social activities, the metaverse will likely be a digital platform designed to provide services and digital goods to users. Metaverse development is often linked to advancing virtual reality technology due to increasing demands for immersion. Recent interest in metaverse development is influenced by Web3, a concept for a decentralized iteration of the internet. Inpainting describes the process of filling in missing or corrupted parts of digital images and videos. It is often used to repair old photographs or remove unwanted elements from pictures. The process can also be used to generate new, realistic-looking images from scratch, by filling in gaps in incomplete data. Virtual objects are three-dimensional (3D) models that are created by computer graphics and used to represent real or imaginary things in a virtual world. They can be static, like buildings or furniture, or they can be animated, like characters or animals.

SUMMARY

Embodiments of the present invention disclose a computer-implemented method, a computer program product, and a system, the computer-implemented method comprising: identifying a virtual object to be generated in a three-dimensional virtual environment based on a natural language utterance; generating the virtual object based on a CLIP-guided Generative Latent Space (CLIP-GLS) analysis; monitoring usage of the generated virtual object in the three-dimensional virtual space; inferring human perception data from the monitoring; and generating a utility score for the virtual object based on the human perception data.

DETAILED DESCRIPTION

Embodiments of the present invention recognize that Hierarchical Text-Conditional Image Generation systems utilize Contrastive Language-Image Pre-Training (CLIP) latents to enable language-guided image manipulations and inpainting. For example, when applied to a two-dimensional (2D) image, embodiments receive a natural language command to "replace the dog sitting on the sofa with a cat," wherein embodiments of the present invention utilize a Hierarchical Text-Conditional Image Generation system to remove the image of the dog on the sofa and inpaint an image of a cat in a sitting position on the sofa. Embodiments of the present invention recognize that while such use of CLIP latents is primarily focused on 2D object generation, the same technology can be applied to virtual three-dimensional (3D) objects including those in a virtual space.

Embodiments of the present invention improve the art by utilizing scoring to produce virtual objects with increased utility in any future generative iterations. Embodiments of the present invention improve the art by analyzing 3D virtual objects created in a predetermined virtual space/platform (e.g., metaverse) through utterances to a Hierarchical Text-Conditional Image Generation system to derive a contextually sensitive utility score for inpainted objects, wherein the utility score aids the iteration of inpainted virtual objects appearing in the predetermined virtual space (e.g., metaverse). Moreover, embodiments of the present invention improve the art by determining the utility of inpainted virtual objects in a predetermined virtual environment (e.g., 3D virtual environment), wherein determining utility of inpainted virtual objects in a 3D virtual environment comprises: (i) identifying a virtual object to be generated in the 3D virtual environment based on a natural language utterance, (ii) generating the virtual object based on a CLIP-guided Generative Latent Space (CLIP-GLS) analysis, (iii) extracting features of the generated virtual object, (iv) monitoring usage of the generated virtual object in the 3D virtual space, (v) inferring human perception data from the monitoring, and (vi) generating a utility score for the virtual object based on the human perception data. Embodiments of the present invention improve the art by utilizing scoring to produce virtual objects with higher utility in the future generative iterations. It is important to note that virtual objects may represent 2D and 3D virtual objects.

Figure 1:
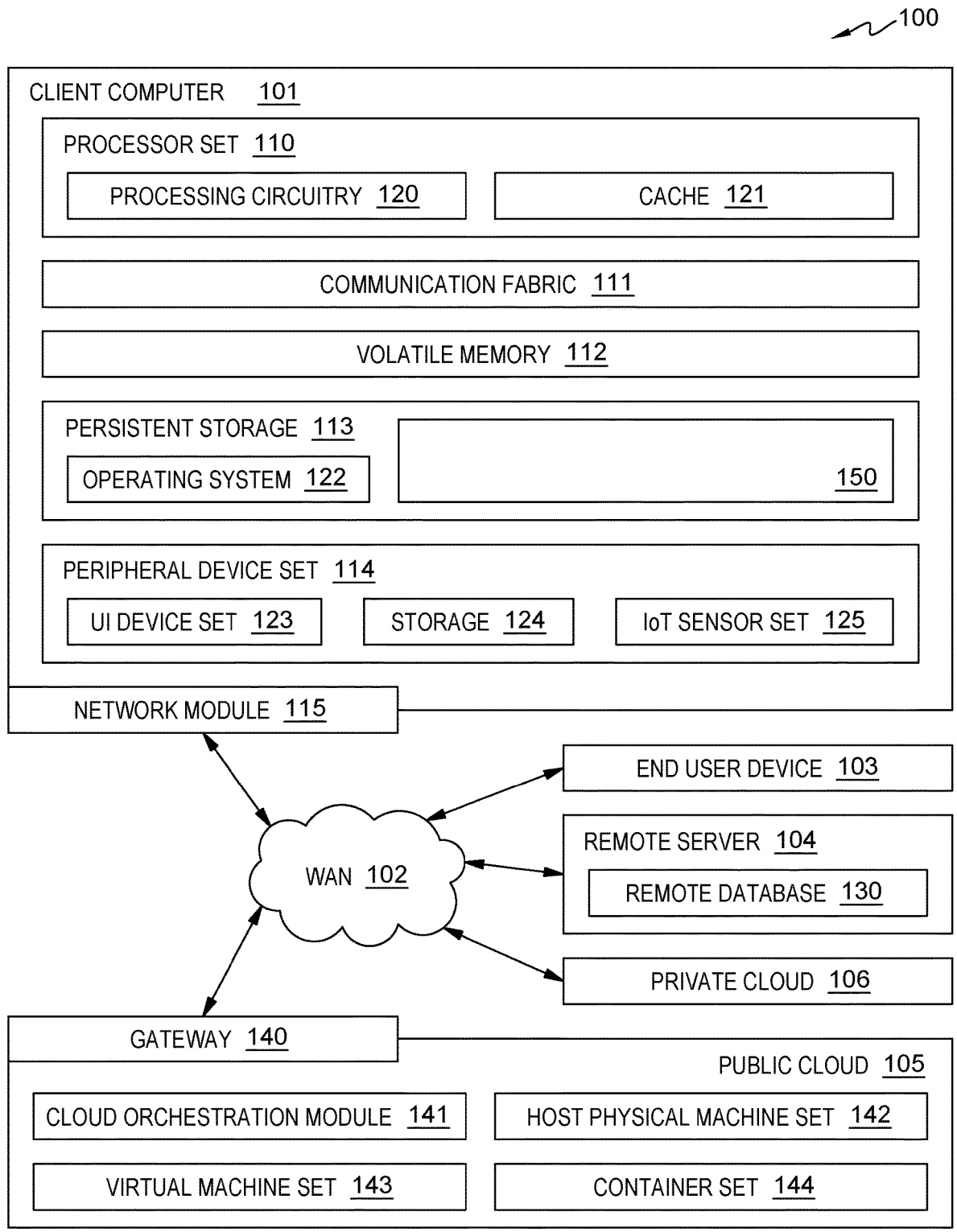
FIG. 1 is a functional block diagram illustrating a distributed data processing environment, executing a virtual object generation program, in accordance with an embodiment of the present invention.

Implementation of embodiments of the invention may take a variety of forms, and exemplary implementation details are discussed subsequently with reference to the Figures (i.e., FIG. 1-FIG. 3).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Computing environment 100 contains an example of an environment for the execution of at least some of the computer code involved in performing the inventive methods, such as virtual object generation program (component) 150. In addition to component 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and component 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in component 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in component 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Component 150 may score the utility of objects created through inpainting in a metaverse environment for the purposes of utilizing this scoring to produce objects with higher utility in future generative iterations. Component 150 may determine the utility of inpainted virtual objects in a 3D virtual environment, wherein determining utility of inpainted virtual objects in a 3D virtual environment may comprise: (i) identifying a virtual object to be generated in the 3D virtual environment based on a natural language utterance, (ii) generating the virtual object based on a CLIP-guided Generative Latent Space (CLIP-GLS) analysis, (iii) extracting features of the generated virtual object, (iv) monitoring usage of the generated virtual object in the 3D virtual space, (v) inferring human perception data from the monitoring, and (vi) generating a utility score for the virtual object based on the human perception data.

In various embodiments, component 150 executes a pre-configuration, wherein pre-configuration enables integration with a metaverse space whereby virtual objects created in the metaverse environment have consented to being monitored by component 150. Component 150 may execute an analysis of Hierarchical Text-Conditional Image Generation utterances to classify the virtual object to be constructed and classify the contextual cues in the metaverse environment. Component 150 may execute an analysis of CLIP-Guided Generative Latent Space generated object in the metaverse to determine features of the classified virtual object and/or classified contextual cues in the metaverse environment, discussed above. Component 150 may execute an inference of human perception data from monitoring the usage of the determined features of the classified virtual object and/or classified contextual cues in the metaverse environment, discussed above, in the metaverse environment to determine a utility score for how well the object fit the context it was used in. One simple example of human perception data is how a virtual object has been previously utilized by one or more users based on a collective crowdsourced usage from an aggregate population and utilizing the average response of the aggregate population. Component 150 may actively intervene to modify the determined features of the classified virtual object and/or classified contextual cues in the metaverse environment, discussed above, by modifying CLIP-Guided Generative Latent Space with based on product feedback to produce an updated version of the virtual object with increased utility in the same context.

Component 150 may score the utility of objects created through inpainting in a metaverse environment for the purposes of utilizing this scoring to produce objects with higher utility in future generative iterations. In various embodiments, a user in a metaverse simulation may submit requests to component 150. For example, a user in a metaverse simulation submits the request "add a blackboard to the front of the room," wherein component 150 receives the request and utilizes a Hierarchical Text-Conditional Image Generation system to execute and/or mange the request. In this example, using enabling art, component 150 generates a virtual object representing a blackboard, selects an estimated size of the board, selects a frame around the board, and selects a position in the room to place the virtual blackboard. In this example, component 150 monitors the usage of the generated virtual blackboard in a predetermined virtual space to derive a utility score for how well the blackboard was fit for purpose. This utility score is collected and stored by component 150, wherein component 150 utilizes the generated utility score as a factor in the generation of future virtual objects created by a Hierarchical Text-Conditional Image Generation system that share a similar context.

In another example, a user in a metaverse simulation is holding a meeting. The user requests component 150, via the Hierarchical Text-Conditional Image Generation system, to "add a table to the room." Using enabling art, component 150, via the Hierarchical Text-Conditional Image Generation system, generates a virtual table, selects an estimated size of the table, color, and position in the room. In this example, component 150 monitors the usage of this generated virtual table in the virtual space, by monitoring a user's interaction with one or more virtual objects, to derive a utility score associated with how well the table was fit for the generated purpose. For example, based on a user's interactions with one or more virtual objects, (e.g., virtual object creation, virtual object interaction, environmental virtual object contextual cues, etc.), over time, historical references for object interactions can be scored based, at least in part, on past usage from similar (i.e., like-users). The scoring based on historical user usage data may enable comparative analysis of the collected data (e.g., historical reference data associated with object interactions from a user, and past user usage).

In various embodiments, the utility score is factored into the generation of future virtual objects created by a Hierarchical Text-Conditional Image Generation system that share a similar context, which results in optimized and efficient fittings of meeting or office related requests (e.g., tables) being generated. It is important to note that the provided examples are not intended to be limiting and the invention is not limited to tables, office related furniture, blackboards, and/or education related furniture or objects and can be utilized for any spatial objects known and understood in the art.

Figure 2:
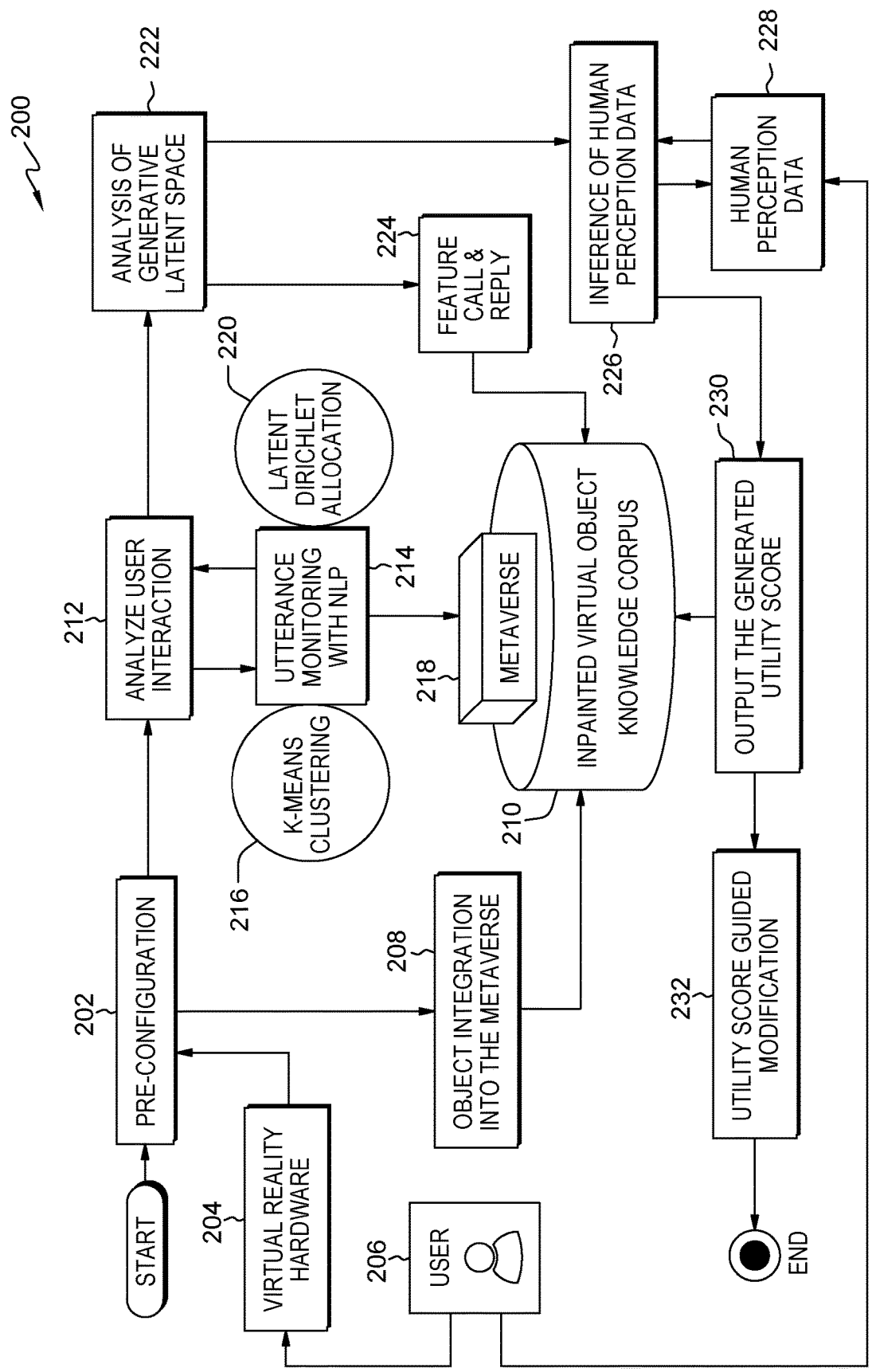
FIG. 2 illustrates a functional block diagram and operational steps of the virtual object generation program, on a server computer within the distributed data processing environment of FIGS. 1, in accordance with an embodiment of the present invention.

FIG. 2 illustrates operational steps of component 150, generally designated 200, in communication with client computer 101, remote server 104, private cloud 106, EUD 103, and/or public cloud 105, within distributed data processing environment 100, for identifying which process to execute to improve compilation time based on historical metadata, in accordance with an embodiment of the present invention. FIG. 2 provides an illustration of one implementation and does not imply any limitations with regard to the environments in which different embodiments may be implemented. Many modifications to the depicted environment may be made by those skilled in the art without departing from the scope of the invention as recited by the claims.

In the depicted embodiment, component 150 executes pre-configuration 202. In the depicted embodiment, component 150 is registered to a metaverse environment (metaverse 218) whereby user 206 within metaverse 218 consent to the monitoring and analyzing of generated object. Metaverse 218 may be any virtual 3D environment and/or platform known in the art. The pre-configuration permits integration with a predetermined space in the metaverse (i.e., object integration into metaverse 218), which enables the display and interaction with inpainted virtual objects in metaverse 218. Additionally, pre-configuration 202 enables access to inpainted virtual objects knowledge corpus (knowledge corpus) 210. User 206 interacts with metaverse 218 and component 150 through virtual reality (VR) hardware 204, wherein the hardware, software, and virtual environment may work within a collaborative method to monitor and capture user data (e.g., user interaction with one or more virtually generated objects). VR hardware 204 is any hardware and underlying software, known and understood in the art, that is used to produce stimuli to manipulate the VR user's sensors (e.g., VR headset, haptic sensors, and/or any other VR devices or hardware known and understood in the art). VR hardware 204 may comprise user interface, microphone, visual display, and/or any other hardware or software known in the art that can facilitate and/or monitor user interaction. VR hardware 204 can be worn on the body or used separately away from user 206. VR hardware uses sensors to track motions, for example, hands, head, and eyes. Component 150 may integrate with metaverse 218 whereby metaverse 218 provides an event-based input stream of new virtual object creation, virtual object interaction, environmental virtual object contextual cues, etc.

In the depicted embodiment, component 150 analyzes user interaction 212 within metaverse 218. Component 150 may execute an analysis of a virtual object creation through natural language utterances made by user 206. More specifically, component 150 may monitor user utterance with natural language processors (NLP) 214 and analyze the natural language utterances made by users within metaverse 218 to determine: the type of object being requested, and the context of the object request. For example, the user issues a command, via virtual reality hardware 204, to "add a blackboard to the front of the room," results in the analysis determining that: the type of object being requested is "blackboard," the context of the object request is "room, front," and the environmental area for the utterance is a classroom environment. The utterance request, inferred object(s), and environment are classified and stored in a central virtual object corpus (i.e., knowledge corpus 210) for metaverse 218. Clustering methods include: K-Means clustering 216 and Latent Dirichlet Allocation 220. K-Means clustering 216 is a clustering method is used to automatically cluster similar utterances together, which is useful for deriving the different types of objects that are being requested. Latent Dirichlet Allocation 220 is a clustering method that determines the different contexts that objects are being requested in, which is useful for determining where each type of object is commonly used.

In the depicted embodiment, component 150 execute an analysis of generative latent space 222 to determine features of virtual object. In various embodiments, component 150, via metaverse 218, may uses a CLIP-Guided Generative Latent Space (CLIP-GLS) to generate a virtual object from the natural language utterance that is inpainted into metaverse 218.

Component 150 may extract the generated virtual object, via feature call and reply 224, from the CLIP-GLS and uses deep learning methods to analyze the object to determine its features, wherein call an reply 224 may perform quantification of the virtual object within a VR space, build out metadata that supports and also enriches the virtual object. The feature extraction method may comprise: convolutional neural networks, and recurrent neural networks. Convolutional Neural Networks is a neural network used to automatically extract the visual features of the object such as color, shape, and so forth. Recurrent Neural Networks is a neural network used to automatically extract the semantic features of the object such as what the object is used for.

In the depicted embodiment, component 150 executes an inference of human perception data 226. Component 150 may monitor the usage of the virtual object within metaverse 218 to determine how well the object fits the context in which it was request and/or used. Component 150 may infer human perception data 228 from the event-based input stream collected and fed by virtual reality hardware 204 to component 150. Human perception data 228 comprises, but is not limited to, visual data, audio data, tactile data, and/or suitability data. Visual data is data related to how the object looks in the environment, wherein visual data may be gathered by monitoring, via virtual reality hardware 204, how long user 206 looks at the object, how close they get to the object, etc. Audio data is data related to how the object sounds in the environment, wherein audio data may be gathered by monitoring, via virtual reality hardware 204, how long user 206 listens audio associated to the generated object (e.g., what they say about the object, how they respond to questions about the object, etc.). Tactile data is data concerning how the object feels in the environment, wherein tactile data may be gathered by monitoring, via virtual reality hardware 204, how long user 206 touches/interacts with the generated object (e.g., how hard they press on it, if the move it around or adjust it, etc.). Suitability data is data related to how well the object fits in the environment, wherein suitability data may be gathered by monitoring, via virtual reality hardware 204, how often the object is used, how often it is moved, how often the object is adjusted, etc.).

Component 150 may utilize the observational data (e.g., human perception data 228) to derive a utility score for the inpainted generated object in metaverse 218. Component 150 may calculate/derive a utility score through linear regression, random forest, and/or bayesian inference. Linear regression may be a method used to generate a utility score based on the different features of the virtual object. For example, the score could be generated based on the object's color, and/or shape. Random forest may be used to generate a utility score based on the different contexts that the virtual object is used in. For example, the score could be generated based on how often the object is used in its predetermined setting (e.g., how often a chalkboard is used in a classroom environment, and/or a business environment). Bayesian inference may be used to generate a utility score based on the different contexts the virtual object has been used in. For example, the suitability of the object could be derived from how often it has aided in a task's completion, how often it has been used in the same context, and so forth. Component 150 may output the generated utility score 230 to a user via virtual reality hardware 204. In the depicted embodiment, component 150 outputs the generated utility score 230 and stores the generated utility score to knowledge corpus 210, alongside the derived classifications and contextual data.

In the depicted embodiment, component 150 executes a utility score guided modification 232. Component 150 may execute a utility score guided modification 232 of CLIP-Guided Generative Latent Space inpainted objects. In various embodiments, the CLIP-GLS can be modified based on the generated utility score for an inpainted object to increase the accuracy of the match the human perception data by a predetermined percentage. In some embodiments, component 150 modifies the CLIP-Guided Generative Latent Space inpainted objects by sampling from the latent space in a way that maximizes the expected utility of the generated objects. Component 150 may utilize a reinforcement learning agent to sample from the latent space, wherein the reinforcement learning agent may be trained to maximize the expected utility of the generated objects by interacting with the CLIP-GLS. The reinforcement learning agent's state space may comprise the current latent vector, the current context, and the current human perception data. The reinforcement learning agent's action space may comprise a plurality of predetermined latent vectors that may be generated.

In various embodiments, existing inpainted virtual objects may be modified based upon the newly generated objects by the CLIP-GLS. Component 150 may modify existing inpainted virtual objects by matching the latent vectors of the two objects and then blending the two objects together. The agent (e.g., reinforcement learning agent) is trained to generate a new virtual object that maximizes the expected utility of the inpainted virtual object. In various embodiments, component 150 creates new inpainted virtual objects from scratch through the CLIP-GLS. Component 150 may create new inpainted virtual objects from scratch by randomly sampling from the latent space and then blending the newly generated object with an existing object, wherein an agent (e.g., reinforcement learning agent) may be trained to generate a new virtual object that maximizes the expected utility of the inpainted virtual object. In various embodiments component 150 utilizes user feedback to modify the latent space. Component 150 may utilizes human feedback to modify the latent space by sampling from the latent space in a way that maximizes the expected utility of the generated objects, wherein an agent may be trained to generate a new virtual object that maximizes the expected utility of the inpainted virtual object.

Figure 3:
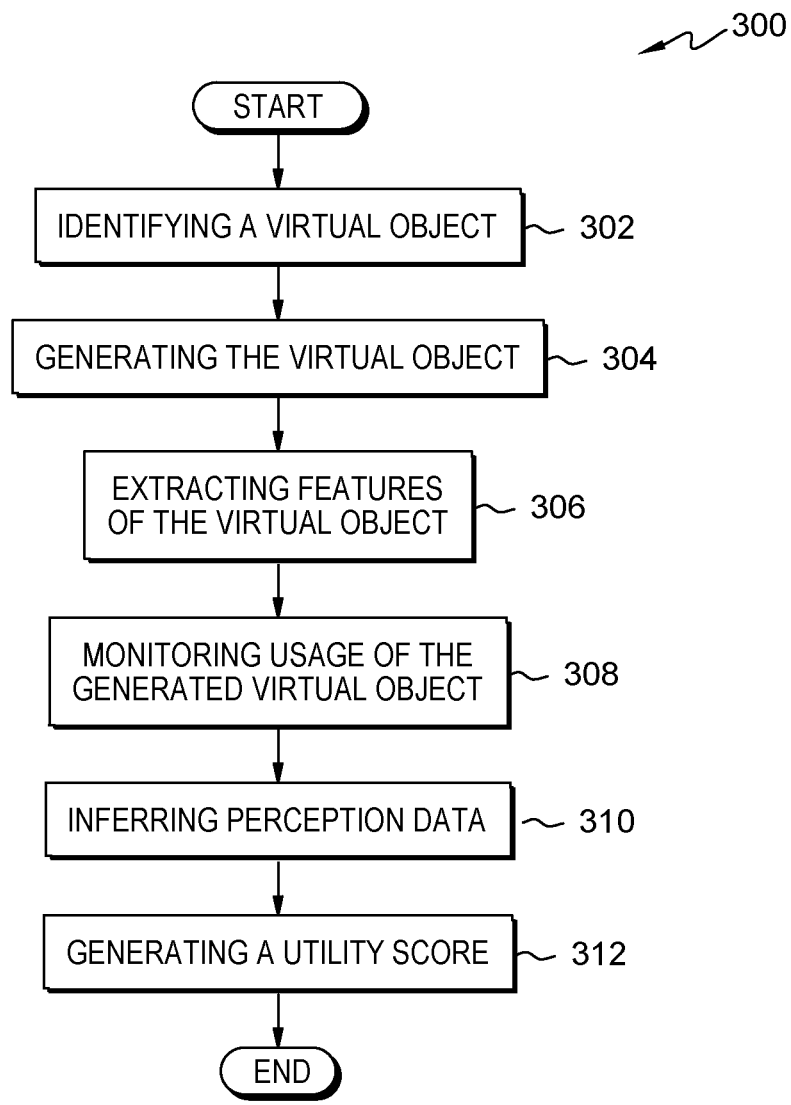
FIG. 3 illustrates operational steps of the virtual object generation program, on a server computer within the distributed data processing environment of FIGS. 1, in accordance with an embodiment of the present invention.

FIG. 3 illustrates operational steps of component 150, generally designated 300, in communication with client computer 101, remote server 104, private cloud 106, EUD 103, and/or public cloud 105, within distributed data processing environment 100, for improving compilation time based on historical metadata, in accordance with an embodiment of the present invention. FIG. 3 provides an illustration of one implementation and does not imply any limitations with regard to the environments in which different embodiments may be implemented. Many modifications to the depicted environment may be made by those skilled in the art without departing from the scope of the invention as recited by the claims.

In step 302, component 150 identifies a virtual object for generation. In various embodiments, component 150 identifies a virtual object to be generated in the 3D virtual environment (e.g., metaverse) based on a natural language utterance. Component 150 may monitor the actions of a user (e.g., eye movement, eye focus, user movement, user interaction with virtual objects, user communications, etc.) and identify a virtual object to generation based on a user action. For example, a user requests "a table with eight chairs be placed in the middle of the room," wherein component 150 identifies, via natural language processing, that the user is requesting the generation of a table large with eight chairs be generated in the middle of the room.

In step 304, component 150 generates the virtual object. In various embodiments, component 150 generates the identified virtual object in step 302 in a predetermined space in a 3D virtual environment. Component 150 may generate the identified virtual object based on a CLIP-guided Generative Latent Space (CLIP-GLS) analysis. In some embodiments, the generated virtual object is inpainted in the 3D virtual environment. The 3D virtual environment may be predetermined.

In step 306, component 150 extracts feature of the virtual object. In various embodiments, extracting features of the generated virtual object. Component 150 may extract the generated virtual object from the CLIP-GLS and may use deep learning methods to analyze the object to determine its features, wherein feature extraction methods comprise: convolutional neural networks, and recurrent neural networks.

In step 308, component 150 monitors the usage of the virtual object. In various embodiments, component 150 monitors, via VR hardware, the usage of the generated virtual object in the 3D virtual space. Component 150 may monitor the actions of a user (e.g., eye movement, eye focus, user movement, user interaction with virtual objects, user communications, etc.), via VR hardware to monitor and identify the usage of the virtual object. Component 150 may monitor the usage of the virtual object within a predetermined 3D virtual space to determine how well the object fits the context in which the virtual object was request and/or used.

In step 310, component 150 infers perception data. In various embodiments, component 150 may infer human perception data from monitored usage of the virtual object. Component 150 may infer human perception data from the event-based input stream collected and fed by VR hardware to component 150. Human perception data 228 comprises, but is not limited to, visual data, audio data, tactile data, and/or suitability data.

In step 312, component 150 generates a utility score based on the inferred perception data. In various embodiments, generates a utility score for the virtual object based on the human perception data. Component 150 may utilize the observational data (e.g., human perception data 228) to derive a utility score for the inpainted generated virtual object in 3D virtual environment. Component 150 may calculate/derive a utility score through linear regression, random forest, and/or bayesian inference.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   identifying, by one or more processors, a virtual object to be generated in a three-dimensional virtual environment based on a natural language utterance;
   generating the virtual object based on a CLIP-guided Generative Latent Space (CLIP-GLS) analysis;
   monitoring usage of the generated virtual object in the three-dimensional virtual space;
   inferring human perception data from the monitoring; and
   generating a utility score for the virtual object based on the human perception data.

2. The computer-implemented method of claim 1, further comprising:
   extracting features of the generated virtual object.

3. The computer-implemented method of claim 1, further comprising:
   analyzing a Hierarchical Text-Conditional Image Generation utterance to classify the virtual object to be constructed, and to classify one or more contextual cues in the three-dimensional virtual environment.

4. The computer-implemented method of claim 3, further comprising:
   analyzing a CLIP-Guided Generative Latent Space of the generated object to determine features of the classified virtual object of the classified contextual cues in the three-dimensional virtual environment.

5. The computer-implemented method of claim 1, further comprising:
   actively modifying one or more determined features of the classified virtual object or classified contextual cues in the three-dimensional environment by modifying CLIP-Guided Generative Latent Space based on feedback associated with the virtual object to produce a new object with increased utility in a similar context.

6. The computer-implemented method of claim 1, further comprising:
   inpainting a first virtual object in a predetermined virtual environment; and
   modifying the first inpainted virtual object by matching one or more latent vectors of a second inpainted virtual object and blending the first inpainted virtual object and the second inpainted virtual object together.

7. The computer-implemented method of claim 1, further comprising:
modifying the latent space, based on user feedback, by sampling from the latent space to achieve a predetermined utility of the generated virtual object, wherein an agent may be trained to generate an updated version of the virtual object that maximizes a utility of an inpainted virtual object.

8. A computer system, the computer system comprising:
one or more computer processors;
one or more computer readable storage devices; and
program instructions stored on the one or more computer readable storage devices for execution by at least one of the one or more computer processors, the stored program instructions comprising:
program instructions to identify a virtual object to be generated in a three-dimensional virtual environment based on a natural language utterance;
program instructions to generate the virtual object based on a CLIP-guided Generative Latent Space (CLIP-GLS) analysis;
program instructions to monitor usage of the generated virtual object in the three-dimensional virtual space;
program instructions to infer human perception data from the monitoring; and
program instructions to generate a utility score for the virtual object based on the human perception data.

9. The computer system of claim 8, further comprising:
program instructions to extract features of the generated virtual object.

10. The computer system of claim 8, further comprising:
program instructions to analyze a Hierarchical Text-Conditional Image Generation utterance to classify the virtual object to be constructed, and to classify one or more contextual cues in the three-dimensional virtual environment.

11. The computer system of claim 10, further comprising:
program instructions to analyze a CLIP-Guided Generative Latent Space of the generated object to determine features of the classified virtual object of the classified contextual cues in the three-dimensional virtual environment.

12. The computer system of claim 8, further comprising:
program instructions to actively modify one or more determined features of the classified virtual object or classified contextual cues in the three-dimensional environment by modifying CLIP-Guided Generative Latent Space based on feedback associated with the virtual object to produce a new object with increased utility in a similar context.

13. The computer system of claim 8, further comprising:
program instructions to inpainting a first virtual object in a predetermined virtual environment; and
program instructions to modify the first inpainted virtual object by matching one or more latent vectors of a second inpainted virtual object and blending the first inpainted virtual object and the second inpainted virtual object together.

14. The computer system of claim 8, further comprising:
program instructions to modify the latent space, based on user feedback, by sampling from the latent space to achieve a predetermined utility of the generated virtual object, wherein an agent may be trained to generate an updated version of the virtual object that maximizes a utility of an inpainted virtual object.

15. A computer program product, the computer program product comprising:
one or more computer readable storage devices and program instructions stored on the one or more computer readable storage devices, the stored program instructions comprising:
program instructions to identify a virtual object to be generated in a three-dimensional virtual environment based on a natural language utterance;
program instructions to generate the virtual object based on a CLIP-guided Generative Latent Space (CLIP-GLS) analysis;
program instructions to monitor usage of the generated virtual object in the three-dimensional virtual space;
program instructions to infer human perception data from the monitoring; and
program instructions to generate a utility score for the virtual object based on the human perception data.

16. The computer program product of claim 15, further comprising:
program instructions to extract features of the generated virtual object.

17. The computer program product of claim 15, further comprising:
program instructions to analyze a Hierarchical Text-Conditional Image Generation utterance to classify the virtual object to be constructed, and to classify one or more contextual cues in the three-dimensional virtual environment; and
program instructions to analyze a CLIP-Guided Generative Latent Space of the generated object to determine features of the classified virtual object of the classified contextual cues in the three-dimensional virtual environment.

18. The computer program product of claim 15, further comprising:
program instructions to actively modify one or more determined features of the classified virtual object or classified contextual cues in the three-dimensional environment by modifying CLIP-Guided Generative Latent Space based on feedback associated with the virtual object to produce a new object with increased utility in a similar context.

19. The computer program product of claim 15, further comprising:
program instructions to inpainting a first virtual object in a predetermined virtual environment; and
program instructions to modify the first inpainted virtual object by matching one or more latent vectors of a second inpainted virtual object and blending the first inpainted virtual object and the second inpainted virtual object together.

20. The computer program product of claim 15, further comprising:
program instructions to modify the latent space, based on user feedback, by sampling from the latent space to achieve a predetermined utility of the generated virtual object, wherein an agent may be trained to generate an updated version of the virtual object that maximizes a utility of an inpainted virtual object.

* * * * *